Oct. 2, 1934.    H. MAYFIELD    1,975,400
PROTRACTOR
Filed April 18, 1933

Inventor
Henry Mayfield
By Hardway Cathey
Attorneys

Patented Oct. 2, 1934

1,975,400

UNITED STATES PATENT OFFICE 1,975,400

PROTRACTOR

Henry Mayfield, La Porte, Tex.

Application April 18, 1933, Serial No. 666,730

2 Claims. (Cl. 33—1)

This invention relates to a protractor.

An object of the invention is to provide an instrument of the character described specially designed for use in plotting courses in navigation.

Another object is to provide a novel mathematical instrument specially designed for the purpose of laying off, and finding, angles relative to plotting on charts, and for other similar purposes.

Another object is to provide a protractor for use on plotting sheets and charts for laying off courses and finding angles without the necessity of reference to a compass rose.

Another object is to provide a very simple protractor which simplifies the method of plotting in navigation and consequently conduces to a saving of time.

A still further object of the invention is to provide an instrument of this character which combines, as a unit, a protractor and straight edge.

With the above and other objects in view this invention has particular relation to certain novel features of construction, use and arrangement of parts an example of which is given in this specification and illustrated in the accompanying drawing, wherein.

Figure 1:
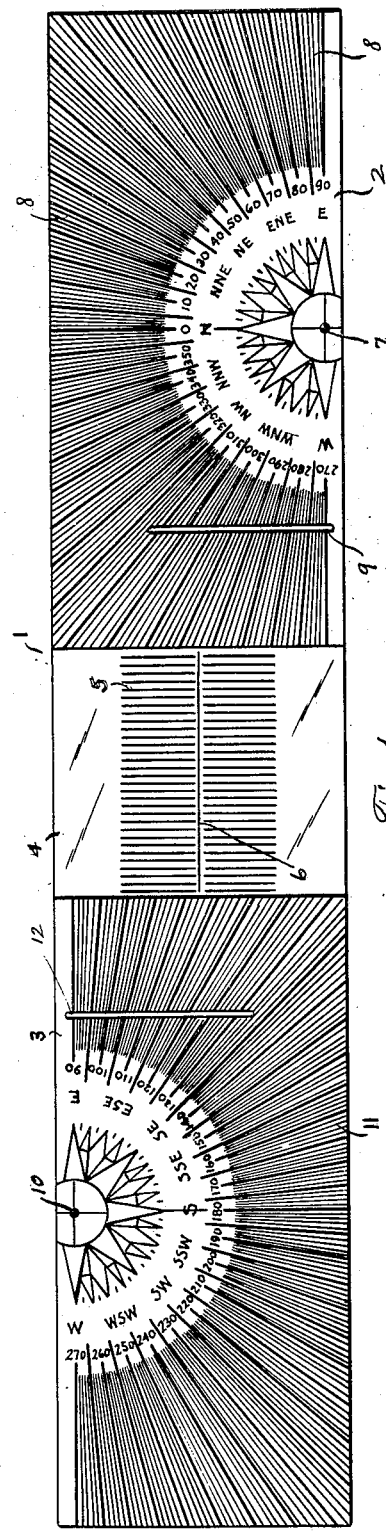
Figure 1 shows a plan view of the instrument.

Referring now more particularly to the drawing wherein like numerals of reference designate the same parts in each of the figures the numeral 1 designates a strip of transparent material, preferably rectangular in shape. In use the instrument will usually be fifteen or twenty inches in length, although the length may be varied, and is of sufficient thickness to give it the desired rigidity.

One end of the strip 1 is configured to indicate the north half 2, of a compass card and the other end of said strip is configured to indicate the south half 3, of the compass card. These north and south halves are separated by the section 4 which has a series of spaced vertical lines 5, said lines being broken and separated by the horizontal line 6.

The top half 2 of the protractor has the central point 7 set in from the edge and with the north, east and west lines radiating from it and indicate by N. E. and W. From an outer circle also radiate the lines, or compass markings for north-northeast, northeast, east northeast, north-northwest, northwest, west northwest, indicated by NNE, NE, ENE, NNW, NW and WNW. Outside of this last mentioned circle are the radial lines 8 for each degree. All of these lines run to the edge of the instrument except those which terminate at the section 4 and the lines so terminating are cut by the transverse slot 9. All of these radial lines, excepting the lines 8, are preferably made heavy so that they will stand out and every tenth line is numbered for degrees, the north line being numbered zero, the east line being numbered ninety degrees, and the west line being numbered two hundred seventy degrees, and the intermediate lines being numbered ten degrees apart.

The south half 3 of the protractor has the central point 10 set in from the edge and with the south, east and west lines radiating from it and indicated by S. E. and W. From an outer circle also radiates the lines or compass markings for east-southeast, southeast, south-southeast, south-southwest, southwest, west-southwest, indicated by ESE, SE, SSE, SSW, SW and WSW. Outside of this last mentioned circle are the radial lines 11, for each degree. All of these lines run to the edge of the instrument except those which terminate at the section 4, and the lines so terminating are cut by the transverse slot 12. All of these radial lines except the line 11, are preferably made heavy so that they will stand out and every tenth line is numbered for degrees, the east line being numbered ninety degrees and the west line being numbered two hundred seventy degrees and the intermediate lines being numbered ten degrees apart.

The vertical lines 5 are exactly perpendicular to the edges of the instrument as are also the two vertical lines which define the section 4. These vertical and horizontal lines and the edges of the instrument are used to line up over the lines on the chart or plotting sheet and it is for this purpose that the instrument should be made transparent. In this manner the instrument may be placed in an exact north and south position relative to the chart, or plotting sheet, thus making reference to a compass rose unnecessary.

Figure 2:
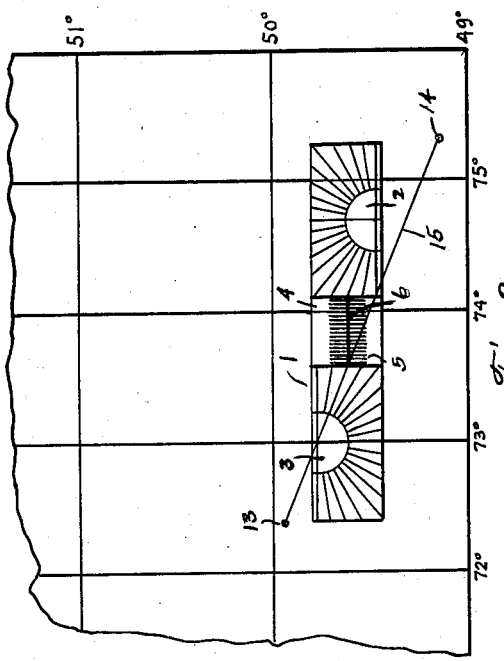
Figure 2 shows the instrument as applied to one character of work.

One use of the instrument is illustrated on Figure 2 whereon the numeral 13 designates the present location and the numeral 14 designates the destination. A line as 15 may be then drawn from the present location as shown on the chart to the point of destination. In the present illustration this line 15 runs in a southeast direction consequently the central point 10 should be placed on, or over, the course line 15 and the instrument adjusted, keeping said center on said line 15, until a meridian line of the chart coincides with any edge of the instrument or any line on it running in a vertical direction or until a parallel of latitude coincides with any vertical edge or vertical line of the instrument. The degree of the course line 15 which is to be followed to reach destination can be thus readily ascertained as it will coincide with the degree line indicated on the south-half of the compass card. If the course line is in a southwest direction, the south half of the compass card would be used in a similar manner as that explained.

If the course line 15 should extend in a northeast or northwest direction the north half of the compass card should be used to ascertain the degree which said course line follows.

The instrument may also be used for plotting a given course or degree on a chart by placing a center 7 or 10 over the point from which the line is to be run and by the use of a pencil placing a dot on the chart at the margin of the instrument or through one of the slots 9, 12 at the proper degree line which is to be followed and then by using the edge of the instrument as a straight edge and connecting the two dots or markings.

The instrument is capable of various uses for finding and laying off courses, angles and the like, and while a preferred form of the instrument has been shown and its use illustrated the disclosure is for the purpose of illustration only, while the broad principle of the invention will be defined by the appended claims.

What I claim is:

1. A protractor comprising a strip of transparent material forming a body, said body being formed with complemental north and south halves of a compass card spaced apart longitudinally thereof and arranged in their respective north and south positions, said body having openings which cut those graduating lines which if extended would cut the space between said halves, the body having a transverse and a longitudinal line thereon located in the space between said halves whereby the protractor may be accurately positioned on a plotting sheet.

2. A protractor comprising a strip of transparent material forming a body, said body being formed with complemental halves of a compass card spaced apart longitudinally thereof and arranged in their respective normal north and south positions, said body having transverse lines which define the space between said halves and which are provided to facilitate the proper positioning of the protractor on a chart or plotting sheet.

HENRY MAYFIELD.